(12) United States Patent
Pippin

(10) Patent No.: US 9,738,466 B2
(45) Date of Patent: Aug. 22, 2017

(54) AUTOMATED BED-LOADED CONTAINER UNLOADER AND METHOD

(71) Applicant: Siemens Industry, Inc., Alpharetta, GA (US)

(72) Inventor: James M. Pippin, Keller, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/084,114

(22) Filed: Mar. 29, 2016

(65) Prior Publication Data

US 2016/0280477 A1    Sep. 29, 2016

Related U.S. Application Data

(63) Continuation-in-part of application No. 13/834,233, filed on Mar. 15, 2013, now Pat. No. 9,321,601, which is a continuation-in-part of application No. 13/091,583, filed on Apr. 21, 2011, now Pat. No. 8,651,794.

(60) Provisional application No. 61/326,876, filed on Apr. 22, 2010.

(51) Int. Cl.
*B65G 35/04* (2006.01)
*B65G 67/24* (2006.01)
*B65G 67/08* (2006.01)

(52) U.S. Cl.
CPC ............ *B65G 67/24* (2013.01); *B65G 67/08* (2013.01)

(58) Field of Classification Search
CPC ......... B65G 67/24; B65G 35/04; B65G 67/00

USPC ...... 414/393, 395, 398, 525.1, 795.4, 797.6, 414/798.1; 198/308.1, 618, 750.1

See application file for complete search history.

(56) References Cited

U.S. PATENT DOCUMENTS

| | | | | |
|---|---|---|---|---|
| 2,572,945 A * | 10/1951 | Quesnoit | ................... | B62B 1/22 280/43.18 |
| 2,916,169 A * | 12/1959 | De Witt | .................... | B60P 1/38 104/172.3 |
| 3,186,566 A * | 6/1965 | Spinanger | ............. | B65G 67/20 280/24 |
| 3,435,950 A * | 4/1969 | Suverkrop | ............ | A01D 33/04 209/557 |
| 3,704,798 A * | 12/1972 | Carpenture, Jr. | ......... | B60P 1/38 414/390 |
| 3,827,585 A * | 8/1974 | McWilliams | .......... | B65G 67/08 198/587 |
| 3,836,021 A * | 9/1974 | McWilliams | .......... | B65G 67/08 198/524 |
| 4,113,122 A * | 9/1978 | Lutz | ........................ | B60P 1/006 414/521 |
| 4,274,789 A * | 6/1981 | Martin | ................... | B60P 1/4421 414/501 |
| 4,749,325 A * | 6/1988 | Hodgetts | ................ | B65G 67/20 242/919 |
| 4,842,471 A * | 6/1989 | Hodgetts | ................ | B60P 1/365 414/514 |

(Continued)

*Primary Examiner* — Joseph Dillon, Jr.

(57) ABSTRACT

An automated unloading apparatus, system and method for use with a container having a plurality of items located on a base belt. The apparatus includes a ramp, a conveyor, and a spooling roller. The configured to pass under the base belt. The conveyor is conveyor configured to remove a first item from the plurality of items. The spooling roller is configured to wind the base belt around itself and by doing so, move the automated unloading apparatus into the interior of the container.

22 Claims, 11 Drawing Sheets

(56) References Cited

U.S. PATENT DOCUMENTS

| | | | | |
|---|---|---|---|---|
| 4,892,456 A * | 1/1990 | Hodgetts | B60P 1/38 | 198/499 |
| 4,927,090 A * | 5/1990 | Matsumoto | B65H 19/30 | 242/533.7 |
| 4,941,794 A * | 7/1990 | Hara | B66F 9/063 | 104/37 |
| 5,082,415 A * | 1/1992 | Hayashi | B65G 67/20 | 414/343 |
| 5,170,968 A * | 12/1992 | Helmner | B60P 1/365 | 198/496 |
| 5,186,596 A * | 2/1993 | Boucher | B65G 67/20 | 198/303 |
| 5,256,021 A * | 10/1993 | Wolf | B65G 67/08 | 198/308.1 |
| 5,482,425 A * | 1/1996 | Podd, Jr. | B65D 88/62 | 220/1.6 |
| 5,538,391 A * | 7/1996 | Bonnet | B65G 59/005 | 198/592 |
| 5,573,365 A * | 11/1996 | Michalski | B60J 7/085 | 414/416.09 |
| 5,902,089 A * | 5/1999 | Sinn | A01K 45/005 | 198/313 |
| 6,164,432 A * | 12/2000 | Monsees | B65H 3/042 | 198/459.4 |
| 8,132,998 B2 * | 3/2012 | Paproski | B60P 1/438 | 414/480 |
| 9,555,982 B2 * | 1/2017 | Girtman | B25J 9/0093 | |
| 9,604,797 B2 * | 3/2017 | Heitplatz | B65G 67/08 | |
| 9,623,569 B2 * | 4/2017 | McCollum | B25J 9/0093 | |
| 2002/0153229 A1 * | 10/2002 | Gilmore | B65G 21/14 | 198/568 |
| 2004/0033126 A1 * | 2/2004 | Thogersen | B64F 1/32 | 414/398 |
| 2004/0165980 A1 * | 8/2004 | Huang | B65G 47/90 | 414/799 |
| 2005/0098940 A1 * | 5/2005 | Malatesta | B65H 5/00 | 271/121 |
| 2007/0147980 A1 * | 6/2007 | Gerke | B65G 59/068 | 414/797.2 |
| 2007/0188324 A1 * | 8/2007 | Ballin | G06Q 10/08 | 340/572.1 |
| 2007/0212208 A1 * | 9/2007 | Hansl | B65G 1/1376 | 414/788.7 |
| 2008/0304947 A1 * | 12/2008 | Stout | B65D 88/62 | 414/525.1 |
| 2009/0169349 A1 * | 7/2009 | Reed | B65G 67/08 | 414/507 |
| 2009/0269183 A1 * | 10/2009 | Richardson | B60P 1/38 | 414/809 |
| 2010/0066014 A1 * | 3/2010 | Brewer, III | B62B 1/14 | 271/297 |
| 2010/0296902 A1 * | 11/2010 | Aschpurwis | B60P 1/365 | 414/499 |
| 2011/0123307 A1 * | 5/2011 | Pillard | B65H 3/063 | 414/795.4 |
| 2016/0236881 A1 * | 8/2016 | Ito | B65G 67/04 | |
| 2017/0016273 A1 * | 1/2017 | Viinonen | B65G 67/20 | |

\* cited by examiner

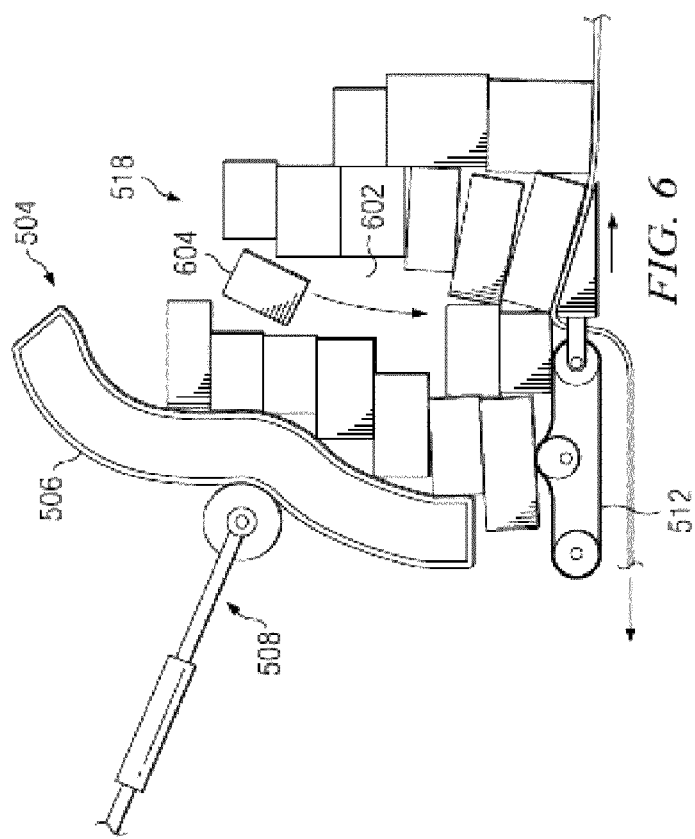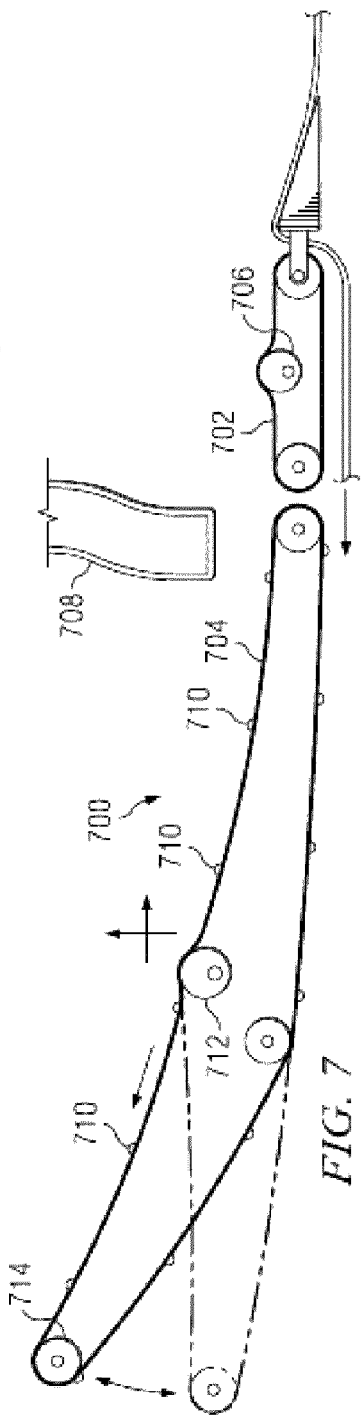

AUTOMATED BED-LOADED CONTAINER UNLOADER AND METHOD

CROSS-REFERENCE TO RELATED APPLICATIONS

The present application is a continuation-in-part of U.S. patent application Ser. No. 13/834,233, filed Mar. 15, 2013, which is a continuation-in-part of U.S. patent application Ser. No. 13/091,583, filed Apr. 21, 2011, now U.S. Pat. No. 8,651,794, and is related to, and claims priority to, U.S. Provisional Patent Application No. 61/326,876, filed Apr. 22, 2010, each of which is hereby incorporated by reference into the present application as if fully set forth herein.

TECHNICAL FIELD

The present disclosure is directed, in general, to mail and parcel processing techniques.

BACKGROUND OF THE DISCLOSURE

Improved and more efficient systems for unloading items from a container or trailer are desirable.

SUMMARY OF THE DISCLOSURE

Various disclosed embodiments include an automated unloading apparatus for use with a container having a plurality of items located on a base belt. The automated unloading apparatus includes a ramp configured to pass under the base belt, a conveyor configured to remove a first item from the plurality of items, a spooling roller configured to wind the base belt around itself and by doing so, move the automated unloading apparatus into the interior of the container. In some implementations, the spooling roller acts as a tensioning mechanism for the base belt and move the ramp under the first item. In some implementations, the automated unloading apparatus includes a plurality of guide wheels configured to controllably extend from each side of the conveyor to respective sides of the container. In some implementations, the ramp is further configured to controllably expand to substantially an entire width of the container. In some implementations, the automated unloading apparatus is substantially stationary during an unloading process and moves into the interior of the container by relative motion of the container. In some implementations, the ramp is further configured to pass under a plurality of side belts. In some implementations, the automated unloading apparatus includes a plurality of guide wheels configured to controllably extend from each side of the conveyor to act as a positioning mechanism for the automated unloading apparatus. In some implementations, the automated unloading apparatus includes a retraction roller system configured to retract the automated unloading apparatus from the container.

In another embodiment, an automated unloading system for use with a container having a plurality of items located on a base belt includes an operator console, a controller, and an automated unloading apparatus. The controller is communicatively coupled to the operator console and the automated unloading apparatus is communicatively coupled to the controller. The automated unloading apparatus includes a ramp configured to pass under the base belt, a conveyor configured to remove a first item from the plurality of items, and a spooling roller configured to wind the base belt around itself and by doing so, move the automated unloading apparatus into the interior of the container. The controller is configured to control operation of the automated unloading apparatus in response to an operator action at the operator console.

In still another embodiment, a method of unloading items from a container having a plurality of items located on a base belt includes moving a ramp of an automated unloading apparatus under the base belt and a first item of the plurality of items. The method also includes removing the first item from the plurality of items using a conveyor of the automated unloading apparatus. The method also includes moving the automated unloading apparatus into the container by winding the base belt around a spooling roller.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 depicts a detail schematic view of a stack control curtain mechanism according to the disclosure;

FIG. 7 depicts a schematic view of a ramping conveyor according to the disclosure;

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In an effort to increase load density and reduce transportation cost, the trucking industry may use a practice called "bed-loading". A trailer may be loaded with items of a broad range of sizes, weights, and shapes. Sacks and items having extreme aspect ratios or weights are typically bed-loaded last in a separate area of the trailer or box bed. On a full trailer, such extreme pieces may be located near the trailer door and would be the first items unloaded.

Manually unloading a bed-loaded trailer can be a grueling job that may be performed at extreme temperatures with relatively low pay. A person unloading standard packages with the aid of an extendible conveyor may achieve sustained rates in the range of 1,000 pieces per hour (1K PPH). Sacks and items of irregular size/shape are typically unloaded at rates much less than standard packages. Such reduced rates are often 200-500 PPH, depending on weight, shape, door configuration, and other factors. The time required to load or unload a trailer directly affects dock door utilization/productivity and therefore facility size. Problems have arisen with previous attempts to automated trailer unloading, including solution cost, cube loss, trailer fleet modification, throughput, staffing, package size/type/formats, loading constraints/configuration, package damage, ease of operation/automation, cost to maintain and ease of retrofitting existing loading dock facilities.

Various disclosed embodiments include unloading items from a trailer or other container generally without operator intervention. A nose ramp of an automated unloading apparatus is moved under a base belt in the trailer and under a first item of a plurality of items in the trailer. As the ramp continues advancing, the item is moved onto a conveyor, which is adapted to carry the item out of the trailer. A stack control curtain maintains the remaining items in a stack or pile during and after removal of the first item. A tensioning mechanism maintains a desired tension on the base belt as the ramp moves under the base belt and the first item.

Figure 1:
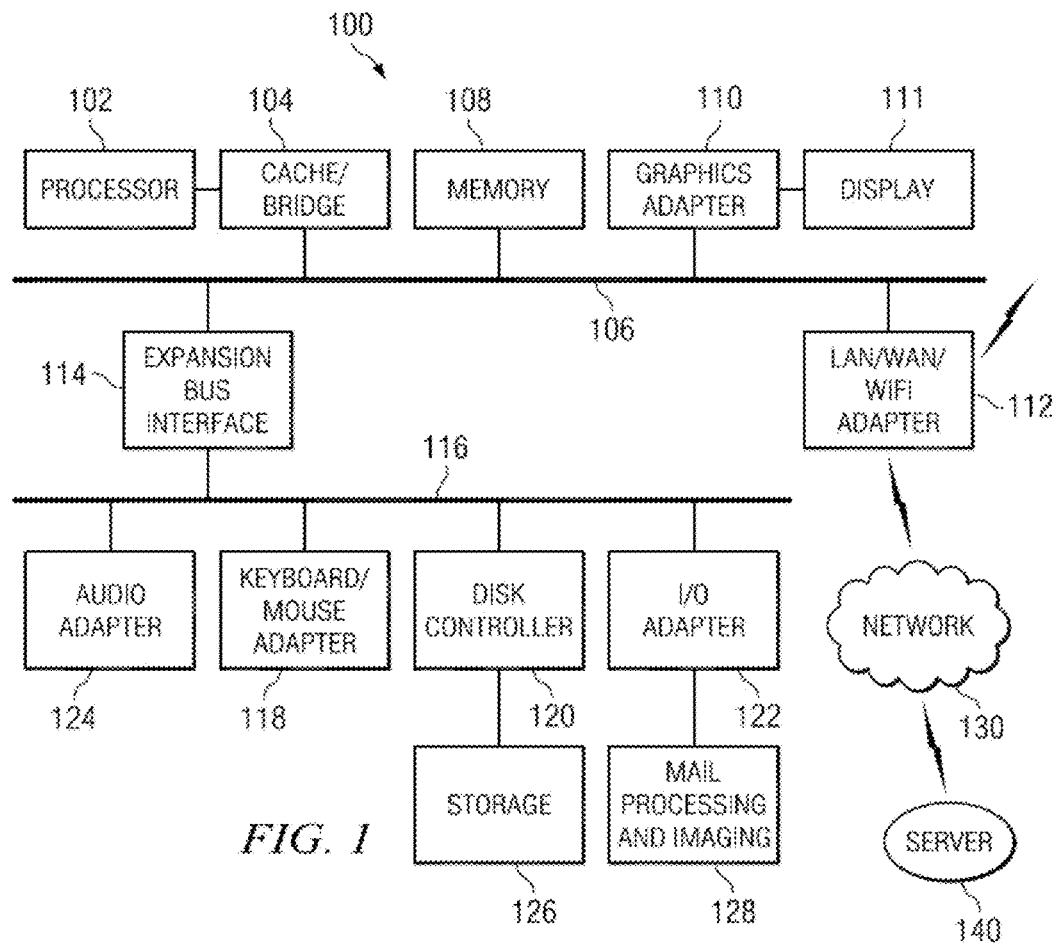
FIG. 1 depicts a block diagram of a data processing system in which an embodiment can be implemented.

FIG. 1 depicts a block diagram of a data processing system 100 in which an embodiment can be implemented, for example as a control system for a mechanism as described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to mail processing and imaging devices 128, as described herein, to image, scan, transport, label, address process, sort, and otherwise processes the mail pieces in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing facility.

Figure 2:
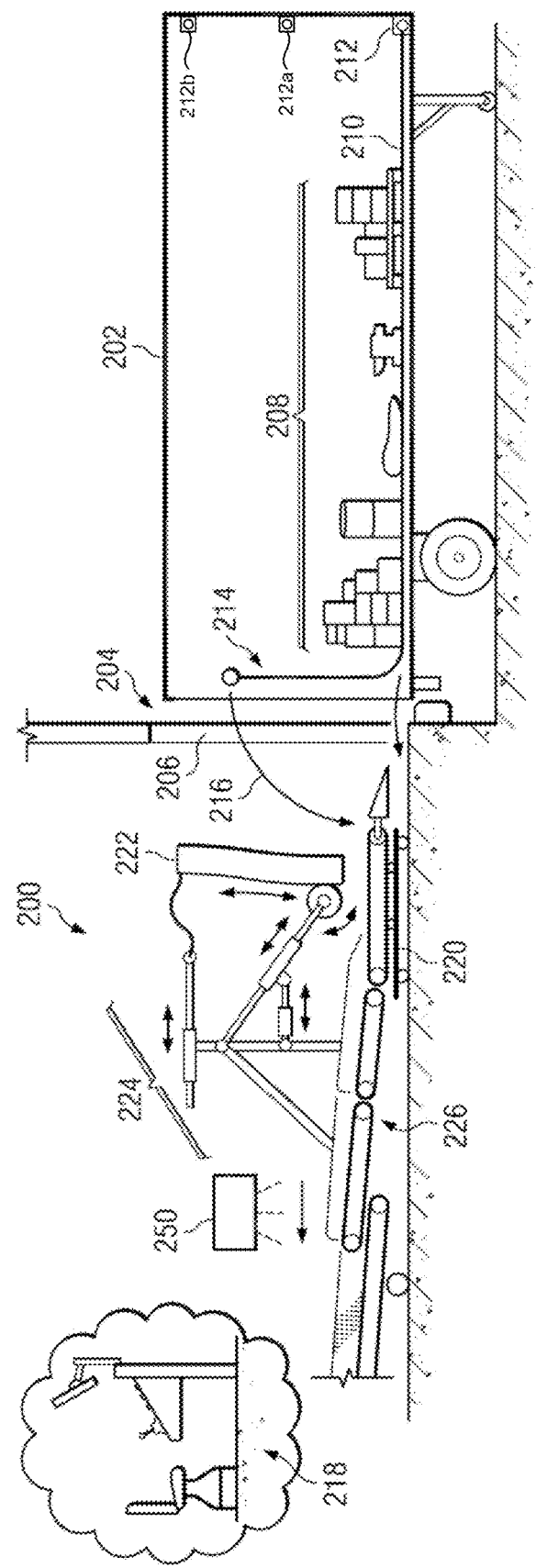
FIG. 2 depicts a schematic view of an automated unloading apparatus according to the disclosure.

FIG. 2 depicts a schematic view of an automatic unloader 200 according to the present disclosure. A trailer 202 is positioned adjacent to a loading dock 204 and a dock door area 206 for unloading. Within the trailer 202 are loaded items 208, which are to be unloaded by the automatic unloader 200. The items 208 are positioned on top of a base belt 210, a first end of which is attached to the trailer at an attachment point 212. A second end of the base belt 210 (opposite to the first end) may be raised to a first transit position 214 to provide supported to stacked items during transit to help prevent stack collapse. The second end of the base belt 210 may alternately be placed in a second transit position (not shown in FIG. 2) on the floor of the trailer 202, where the base belt 210 may be rolled or gathered during transit. From either the first or second transit position, to initiate unloading of the trailer 202, the second end of the base belt 210 is brought generally along the path indicated by the arrow 216 to be attached to the automatic unloader 200, as described in greater detail below.

The unloader 200 is positioned at the open door of the trailer 202 by an operator at an operator console 218. The operator may use a video camera (not shown in FIG. 2) that is mounted to the unloader 200 or to the loading dock 204 and presents the operator with a view of the unloader 200 and the trailer 202. The unloader includes a positioning mechanism 220, which is remotely operated by the operator to position the unloader 200 at the entrance to the trailer 202. The positioning mechanism 220 may be a motorized caster or other mechanism suitable for positioning the unloader 200 relative to the trailer 202 prior to initiating an unloading process or during the unloading process. The positioning mechanism 220 is operable to position the unloader 200 at least along a longitudinal axis of the trailer 202 or horizontally relative to the trailer 202. In some embodiments, the unloader 200 is substantially the same width as the interior of the trailer 202, such that the unloader 200 substantially fills the trailer 202 from one sidewall to the other sidewall.

The unloader 200 also includes a stack control curtain 222 mounted to a positioning mechanism 224. The operation of the stack control curtain 222 and the positioning mechanism 224 will be explained in greater detail with reference to FIGS. 5 and 6. The unloader 200 is coupled to an extendible conveyor 226, which is operable to carry items unloaded by the unloader 200 from the trailer 202. A sensor 250 may be mounted in a position that enables the sensor 250 to sense items on the unloader 200 or the extendible conveyor 226. The sensor 250 is operable to sense a label, RFID tag, barcode, or other identifying feature of such items.

Figure 3:
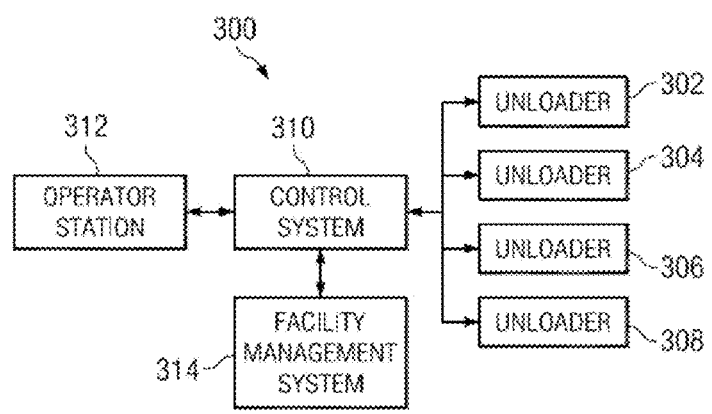
FIG. 3 depicts an automated unloading system according to the disclosure.

FIG. 3 depicts an automated unloading system 300 according to the disclosure. Unloaders 302, 304, 306 and 308 according to the disclosure are controlled by a controller 310. Each of the unloaders 302-308 may be positioned at each of four truck docks and operated to unload four trailers separately or concurrently. An operator may use an operator console 312 to control the unloaders 302-308. The controller 310 may be communicatively coupled to a facility management system 314. The controller 310 may receive address or identification information sensed from items unloaded by one or more of the unloaders 302-308 and send the information to the facility management system 314 (or other external system) for its use in routing the items to desired destinations.

While the operator console 312, the controller 310, and the facility management system 314 are depicted in FIG. 3 as separate elements of the automated unloading system 300, it will be understood that in other embodiments, this functionality of these elements may be provided in one or two elements. In some embodiments, the automated unloading system 300 also includes one or more sensors (not shown in FIG. 3) providing a view of one or more of the unloaders 302-308 and one or more corresponding trailers or other containers. In such embodiments, the controller 310 is further adapted to control an unloader positioning mechanism to position the unloader in a desired position relative to the trailer, prior to initiating an unloading process.

Figure 4:
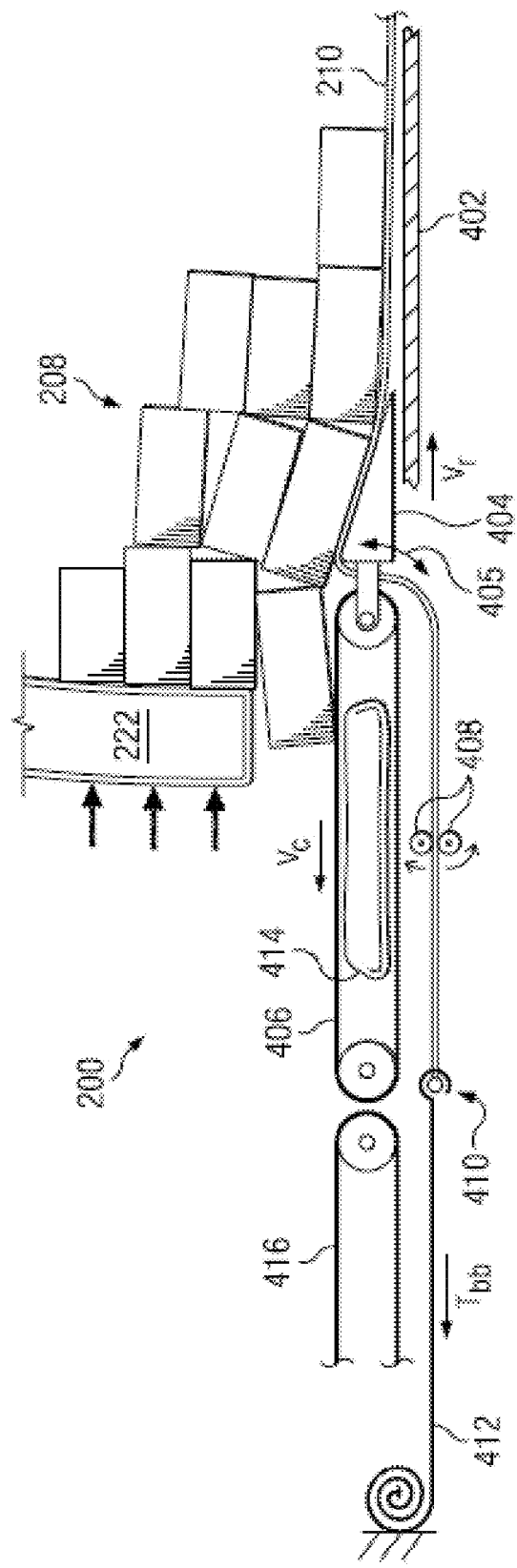
FIG. 4 depicts a schematic detail view of the automated unloading apparatus of FIG. 2.

FIG. 4 depicts a schematic detail view of the automatic unloader system 200. The base belt 210 has been routed over a nose ramp 404, between the nose ramp 404 and a nose conveyor 406, through pinch rollers 408, and coupled at coupling 410 to a tensioning roller 412. The pinch rollers 408 and the tensioning roller 412 comprise a tensioning mechanism for the base belt 210. The nose ramp 405 may pivot about a horizontal axis, as indicated by arrow 405. The tensioning roller 412 maintains a desired tension $T_{bb}$ on the base belt 210 via the coupling 410. The unloader 200 moves itself forward under the base belt 210 and loaded items 208 by using the pinch rollers 408 to pull on the base belt 210. In other embodiments, the unloader 200 moves itself forward using the positioning mechanism 220 and the tensioning roller 412 operates to maintain the base belt 210 taut over the nose ramp 404. The tensioning roller 412 is mounted in a fixed position relative to the loading dock 204, in order to maintain the tension $T_{bb}$ on the base belt 210 regardless of movement of the unloader 200.

The unloader 200 moves into the trailer along the trailer floor 402, sliding the nose ramp 404 under a rearmost item of the items 208. By sliding the nose ramp 404 under an item while the item remains on the base belt 210, the unloader 200 reduces the possibility of the nose ramp 404 pushing the item into the trailer, rather than sliding it up onto the nose conveyor 406. When moving forward, the unloader 200 moves at a speed $V_r$ that substantially matches a speed $V_c$ of a transport belt of the nose conveyor 406. In this way, the items 208 are transferred with substantially no relative motion from the base belt 210 to the nose conveyor 406. Once on the nose conveyor 406, a lowest, rearmost item of the items 208 is carried under the stack curtain 222 out of the trailer 202 along the nose conveyor 406, onto the takeaway conveyor 416, toward the extendible conveyor 226. An upper portion of the transport belt of the nose conveyor 406 may be supported by a cushion 414, to reduce impact forces on items that fall onto the nose conveyor from the items 208.

Note that the descriptions herein of the unloader 200 moving into the trailer 202 (or other container) refers to a relative motion. In many implementations, the container is stationary and the unloader is in motion to move into the container. However, in other implementations, the unloader can be substantially or entirely stationary, while the container is moved onto it. In such cases, the unloader is still seen as moving into the container, in a relative sense, and so the descriptions herein are intended to apply to those cases as well.

As will be described in greater detail below, the stack curtain 222 may be moved toward and away from the items 208 in order to break the lowest, rearmost item free of any item resting upon it, to enable the item to be carried away by the nose conveyor 406. The stack curtain 222 may be moved to a higher position above the nose conveyor 406, to permit a larger item to pass under the stack curtain 222. The stack curtain 222 may be positioned rearward along the nose conveyor, farther from the nose ramp 404, in order to expose a larger portion of the nose conveyor 406, to permit a larger item to rest entirely upon the nose conveyor 406 and be carried away. The unloader 200 is operable to remove a diversity of items 208 (e.g., packages, irregular shapes/weights, sacks, containers, rolling stock, pallets, etc.) from the trailer 202 or other container, whether the items 208 are arranged in orderly, segregated stacks or intermingled in disordered piles.

Figure 5:
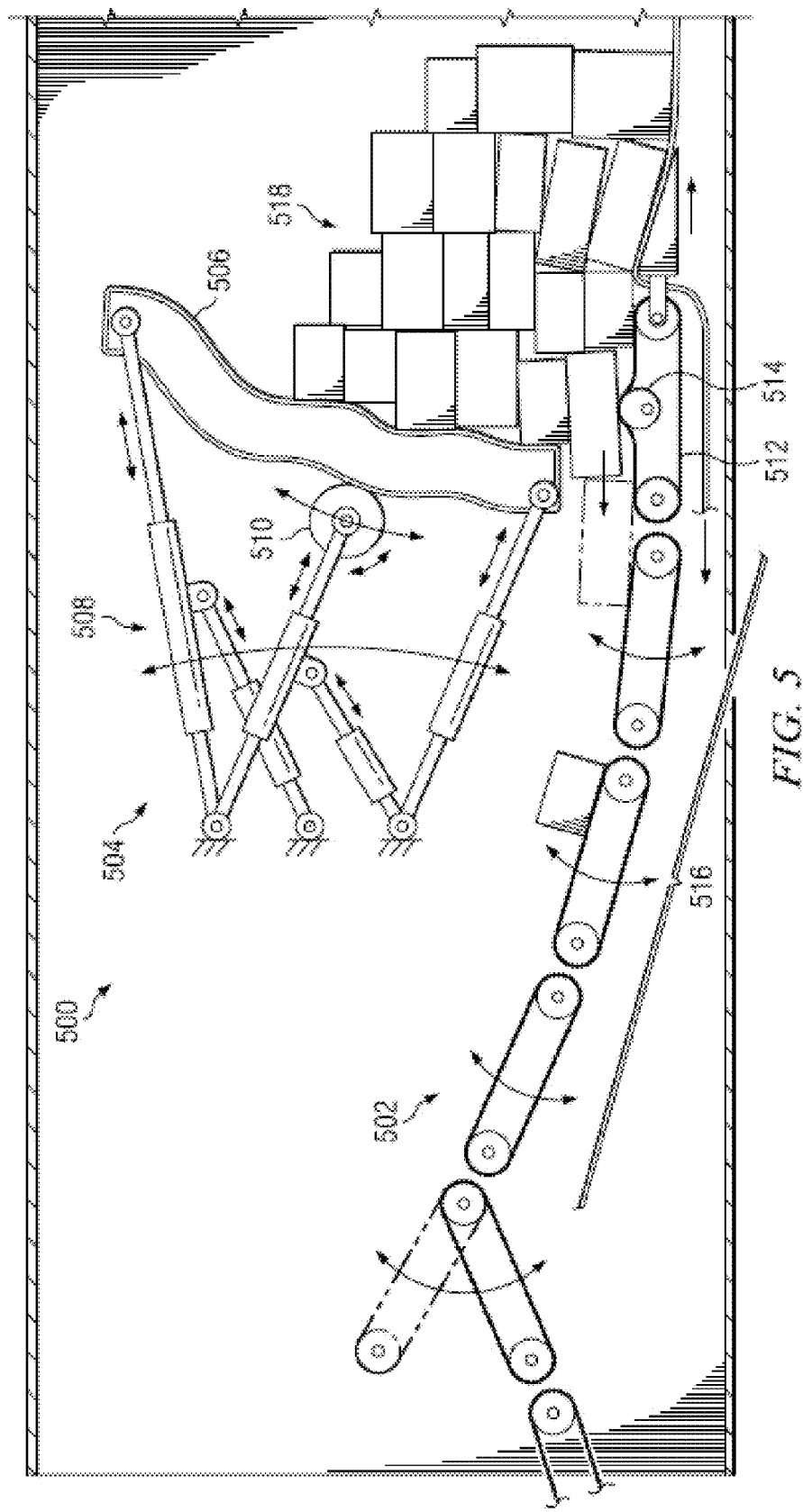
FIG. 5 depicts a schematic view of a second automated unloading apparatus according to the disclosure.

FIG. 5 depicts a schematic view of another automatic unloader 500 according to the present disclosure. The unloader 500 includes a segmented drive ramp 502 and a stack control curtain mechanism 504. The stack control curtain mechanism 504 includes a cushioned stack control curtain 506 and one or more actuators 508 adapted to change a configuration of the stack control curtain 506 relative to items 518. The actuators are operable to independently move the top and bottom of the stack control curtain 506 toward and away from the nose of the trailer 202, as well as to vary a contour of the stack control curtain 506 using a roller 510 or other suitable actuator.

The segmented drive ramp 502 includes a nose conveyor 512 and ramping conveyor segments 516. The nose conveyor 512 has a cam roller 514, which rotates on a longitudinal axis that is not coincident with a geometric longitudinal axis of the roller 514. As the cam roller 514 rotates, it raises and lowers an upper portion of a transport belt of the nose conveyor 512. The cam roller 514 operates to jostle or otherwise disturb the items 518 positioned on the nose conveyor 512, to facilitate removal of a lowest item by the nose conveyor 512. The cushioned stack control curtain 506, the nose conveyor 512, and the ramping conveyor segments 516 manage stack decomposition and reduce free fall distance and impact force for the items 518.

A ramping angle and terracing effect may be created by the ramping conveyor segments 516. As the segmented drive ramp 502 advances deeper into the stack, the ramping conveyor segments 516 may be raised and controlled relative to raising the stack control curtain mechanism 504 to allow package flow between the surface of the segmented drive ramp 502 and the bottom edge of the cushioned stack control curtain 506. As the segmented drive ramp 502 advances into the stack, items are removed at higher and higher levels. The conveyor segments 516 turn on and off to reduce forces between packages and to cancel relative motion between conveyor and package until drive forces are needed The cam roller 514 is mounted below an upper portion of a transport belt of the nose conveyor 512. Cam rollers may also be mounted below upper portions of one or more of the conveyor segments 516 to aid package flow. Pressure and coverage applied by the stack control curtain 506 to the stack is kept within an acceptable range by the actuators 508 to avoid package free fall while not inducing excessive forces or forces that might damage the items 518. A variety of devices know in the art can sense and signal pressure levels. Pressures applied over a small area or at a single point are avoided by making the stack control curtain 506 from a thick cushioned and/or compliant material, such as laminated foam rubber.

FIG. 6 depicts a detail schematic view of the stack control curtain mechanism 504 according to the disclosure. The stack control curtain 506 is moved into a desired configuration by the actuators 508. As individual items are removed from the bottom of the stack or pile of items 518, an internal void 602 may be created within the stack. Where the items are in an otherwise orderly stack or array, such a void may allow an item 604 to drop into the internal void, possibly damaging the item 604 or an item on which it lands, or creating a jam that prevents subsequent items 518 from being removed from the trailer 202. Internal voids may create similar unloading problems is unordered piles of items 518. Under control of the actuators 508, the stack control curtain 506 is adapted to change configuration to prevent formation of internal voids in the stack or pile of items 518.

FIG. 7 depicts a schematic view of a ramping conveyor 700 according to the present disclosure. The ramping conveyor 700 includes a nose conveyor 702 and a variable incline angle conveyor 704. The ramping conveyor 700 supports items on conveyor belts, rather than on underlying solid support structures. The nose conveyor 702 includes a cushioned cam roller 706 that raises and lowers an upper portion of the nose conveyor 702, to break items loose from a stack or pile of items. A stack control curtain 708 restrains upper items of the stack or pile and allows single items to pass from the nose conveyor 702 to the variable incline angle conveyor 704. As may be seen by comparing depicted positions of the stack control curtains 222, 506 and 708 in FIGS. 2, 4, 5 and 7, a stack control curtain according to the disclosure may be moved to multiple desired positions above a nose conveyor and other conveyor segments of unloaders according to the disclosure.

The variable incline angle conveyor 704 may include raised cleats 710 to prevent items on the conveyor 704 from slipping back toward the trailer as an angle from the horizontal of the conveyor 704 is increased. The conveyor 704 may include a cushioned cam roller 712 to control clumping and spacing of items on the conveyor 704. The conveyor 704 includes a roller 714 that may be raised and lowered to vary an angle from the horizontal of an upper portion of the variable incline angle conveyor 704. The suspended belt of the conveyor 704 provides a forgiving surface for items that it transports, to reduce damage to the items. Similar results may be obtained through the use of foam cushions or air bladders beneath the upper portion of the conveyor 704.

The conveyor 704 is generally inclined to cause layers of tall stacks of items to decompose due to gravity. This thinning of layers provides natural metering of package flow for easier hand off from discharge of the conveyor 704 to generally narrower downstream takeaway conveyors. At an opposite end of the conveyor 704 from the nose conveyor 702, the angle is selectively changed to produce a wedge-like engagement of the nose conveyor 702 with items of the stack to facilitate stack decomposition and removal. Similar comments apply to the ramping segmented drive ramp 502 of the unloader 500 depicted in FIG. 5.

Figure 8:
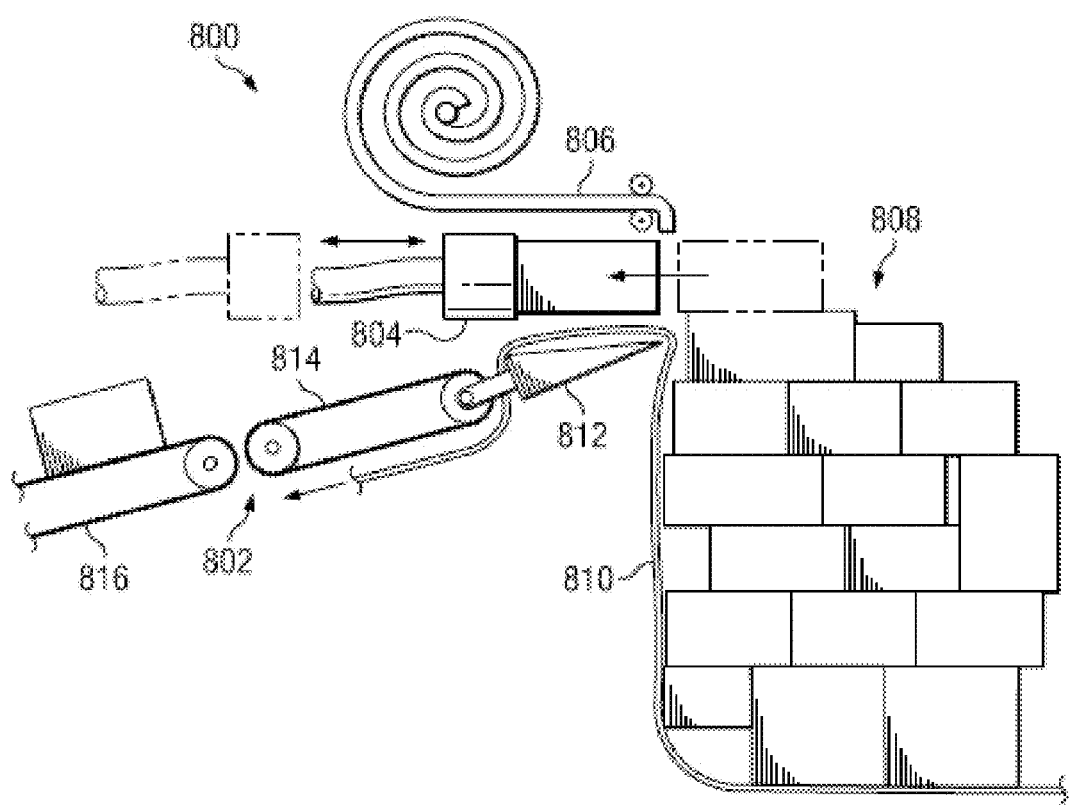
FIG. 8 depicts a schematic view of another automated unloading apparatus according to the disclosure.

FIG. 8 depicts a schematic view of another automatic unloader 800 according to the present disclosure. The unloader 800 includes a conveyor mechanism 802, an item removal mechanism 804, an upper stack control curtain 806, and a lower stack control curtain 810. The unloader 800 unloads items 808 from an upper portion of a stack or pile. The upper portion may be a top, or near the top, of the stack.

The lower stack control curtain 810 passes over a nose ramp 812, and is placed under tension to control a lower portion of the stack of items 808. The item removal mechanism 804 pulls individual items from the top of the stack of items 808 over the nose ramp 812 and onto a nose conveyor 814, which transports the items to a take-away conveyor 816. The item removal mechanism 804 may be a vacuum head, a magnetic head, a hook, or other suitable mechanism for mechanically coupling to an item and pulling the item onto the nose conveyor 814. The relative positions of the item removal mechanism 804 and the nose ramp 812 manages stack decomposition and minimizes free fall distance and resulting impact force. As the top of the stack of items 808 is cleared the conveyor mechanism 802 is lowered down the face of the stack. The lower stack control curtain 810 is kept taut to continue controlling the lower portion of the stack of items 808. The item removal mechanism 804 is mechanically coupled to, and moves with, the conveyor mechanism 802, as the conveyor mechanism 802 moves vertically along the stack of items 808 and horizontally into the trailer (or other container).

As the conveyor mechanism 802 is lowered down the face of the stack, the upper stack control curtain 806 is extended downward to further control the stack of items 808 by forming a barrier against items falling from the stack onto the nose ramp 812. The upper stack control curtain 806 may be positioned farther forward than the lower stack control curtain 810, to be positioned adjacent to, and control, a remaining upper portion of the stack of items 808. When the conveyor mechanism 802 reaches the bottom of the stack of items 808, the conveyor mechanism 802 advances to a face of the remaining portion of the stack of items 808. The conveyor mechanism 802 is raised to the top, or near the top, of the stack and unloading by the item removal mechanism 804 resumes. As the conveyor mechanism 802 is raised, the lower stack control curtain 810 is extended to control the lower portion of the stack, and the upper stack control curtain 806 is retracted.

Figure 9:
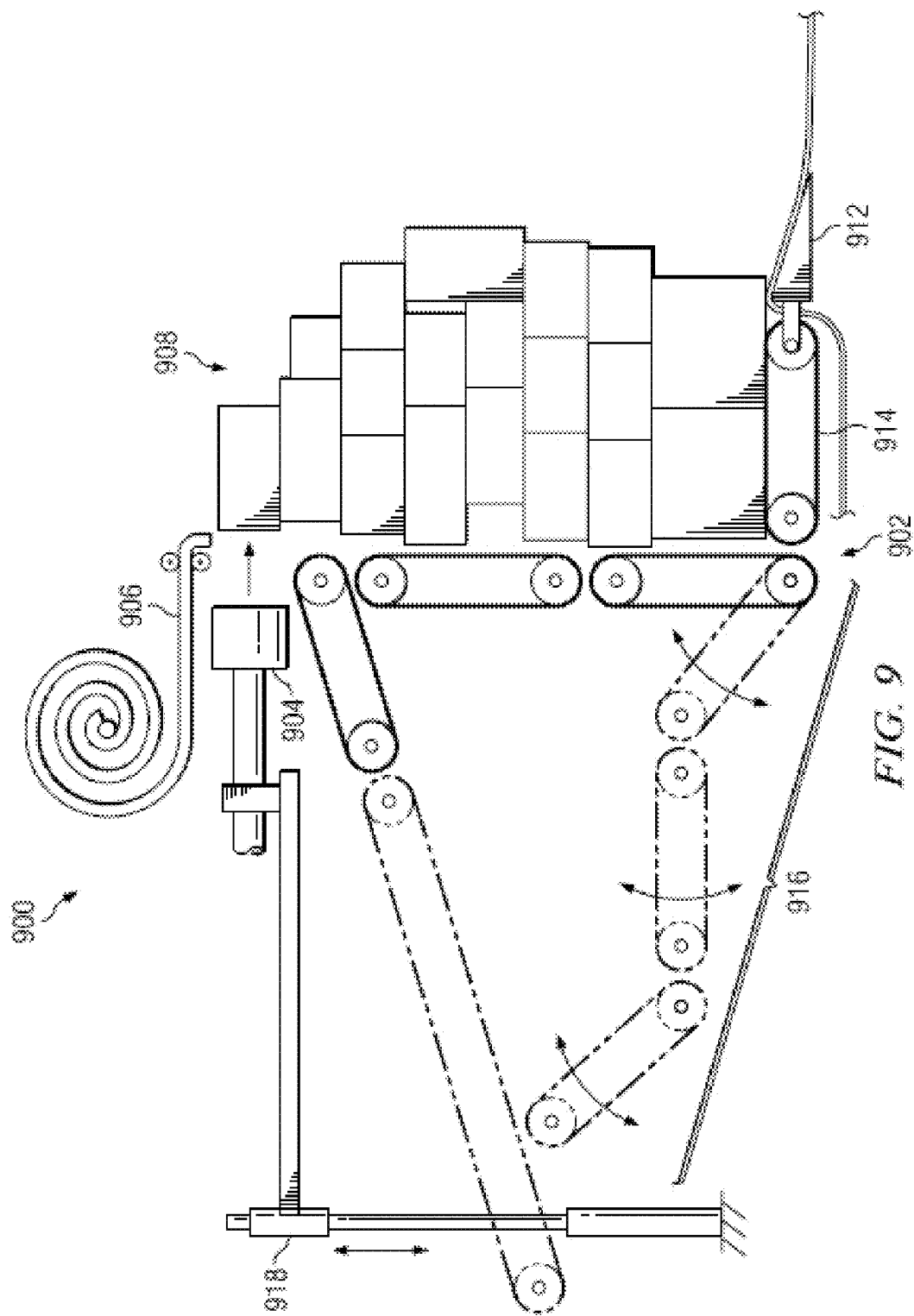
FIG. 9 depicts a schematic view of still another automated unloading apparatus according to the present disclosure.

FIG. 9 depicts a schematic view of another automatic unloader 900 according to the present disclosure. The unloader 900 includes a conveyor mechanism 902, a vacuum head 904, and an upper stack control curtain 906. The conveyor mechanism 902 includes a nose ramp 912, a nose conveyor 914 and a segmented take-away conveyor 916. The nose conveyor 914 and/or some or all segments of the segmented take-away conveyor 916 may be cushioned, as described with reference to nose conveyor 406 shown in FIG. 4. The unloader 900 unloads items 908 from an upper portion of a stack or pile. The upper portion may be a top, or near the top, of the stack. Segments of the segmented take-away conveyor 916 are initially raised to a substantially vertical configuration to control a lower portion of the stack of items 908.

The vacuum head 904 pulls individual items from the top of the stack of items 908 onto a currently uppermost segment of the segmented take-away conveyor 916. The relative positions of the vacuum head 904 and the currently uppermost segment of the segmented take-away conveyor 916 manages stack decomposition and minimizes free fall distance and resulting impact force. As the top of the stack of items 908 is cleared segments of the segmented take-away conveyor 916 are repositioned to reduce the height of the segmented take-away conveyor 916 along the face of the stack. The remaining substantially vertical elements of the segmented take-away conveyor 916 control the lower portion of the stack of items 908. The vacuum head 904 is mechanically coupled to, and moves with, the conveyor mechanism 902, as the conveyor mechanism 902 moves horizontally into the trailer (or other container). The vacuum head 904 is coupled to the conveyor mechanism 902 by a linkage 918 that is operable to raise and lower the vacuum head 904.

As the segments of the segmented take-away conveyor 916 are repositioned to reduce the height of the segmented take-away conveyor 916 along the face of the stack, the upper stack control curtain 906 is extended downward to further control the stack of items 908 by forming a barrier against items falling from the stack onto the segmented take-away conveyor 916. The upper stack control curtain 906 may be positioned farther forward than the substantially vertical elements of the segmented take-away conveyor 916, to be positioned adjacent to, and control, a remaining upper portion of the stack of items 908. When the vacuum head 904 reaches the bottom of the stack of items 908, the conveyor mechanism 902 advances to a face of the remaining portion of the stack of items 908. The vacuum head 904 is raised to the top, or near the top, of the stack and unloading by the vacuum head 904 resumes. As the vacuum head 904 is raised, segments of the segmented take-away conveyor 916 are returned to a substantially vertical configuration to control a lower portion of the stack of items 908, and the upper stack control curtain 906 is retracted.

Figure 10:
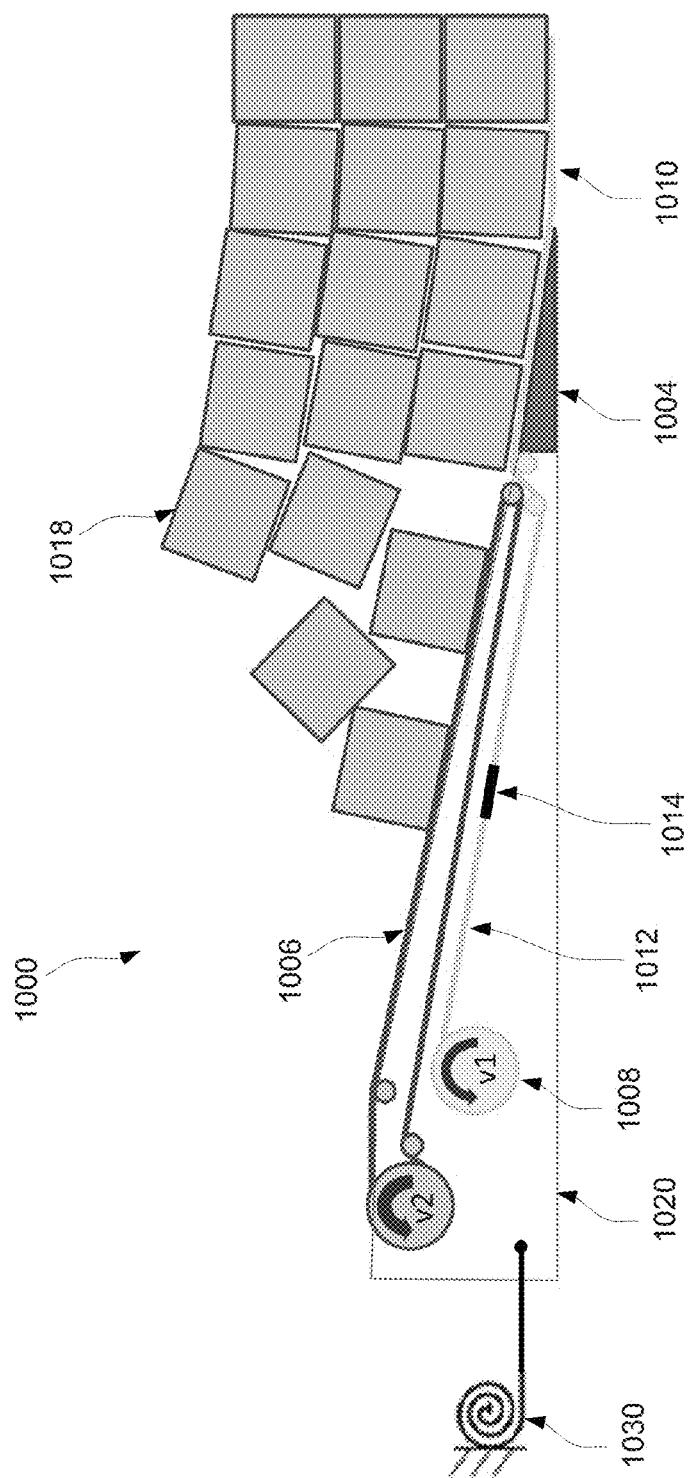
FIG. 10 depicts a schematic detail view of an automatic unloader system 1000 according to disclosed embodiments.

FIG. 10 depicts a schematic detail view of an automatic unloader system 1000 according to disclosed embodiments. The base belt 1010 has been routed over a nose ramp 1004, between the nose ramp 1004 and a nose conveyor 1006, and to a spooling roller 1008. Note that, in this example, the base belt may be connected to a spooling belt 1012 by a coupling mechanism 1014, or may be directly connected to spooling roller 1008. In this example, "base belt 1010" is intended to refer to both possibilities, whether the base belt 1010 is implemented as a single belt connected to spooling roller 1008, or implemented as a combination of a base belt coupled to a spooling belt that is then connected to the spooling roller 1008.

In this example, spooling roller 1008 acts as a tensioning mechanism for the base belt 1010 and also acts as a drive mechanism for automatic unloader system 1000. That is, as spooling roller 1008 winds base belt 1010 around itself, since base belt 1010 is removably fastened to the interior of trailer 202 (or other container), this winding action pulls automatic unloader system 1000 along base belt 1010 and into trailer 202. The automatic unloader system 1000 moves itself forward along base belt 1010, keeping nose ramp 1004 under the base belt under the base belt 210 and loaded items 1018 by using the spooling roller 1008 to pull on the base belt 1010. As should be clear, spooling roller is physically mounted in a fixed position on the extendible portion 1020 of automatic unloader system 1000, such as proximate to the nose ramp 1004 or beneath the nose conveyor 1006.

In various implementations, when moving forward, the automatic unloader system 1000. moves at a speed $V_1$ that substantially matches a speed $V_2$ of a transport belt of the nose conveyor 1006. In this way, the items 1018 are transferred with substantially no relative motion from the base belt 1010 to the nose conveyor 1006.

Various embodiments can also include a retraction roller system 1030, that is mounted in a fixed position relative to the dock or other facility in which the automatic unloader system 1000 operates. Retraction roller system 1030 is connected to the extendible portion 1020 of automatic unloader system 1000, for example by a retraction belt, and can be used to retract the automatic unloader system 1000 from the trailer 202 (or other container). Retraction roller system 1030 can also be used to maintain a tension on extendible portion 1020 for additional control of placement and speed of automatic unloader system 1000 as it moves along the base belt 1310.

Other portions of the automatic unloader system 1000 can be implemented as described in any of the examples set forth herein.

Figure 11:
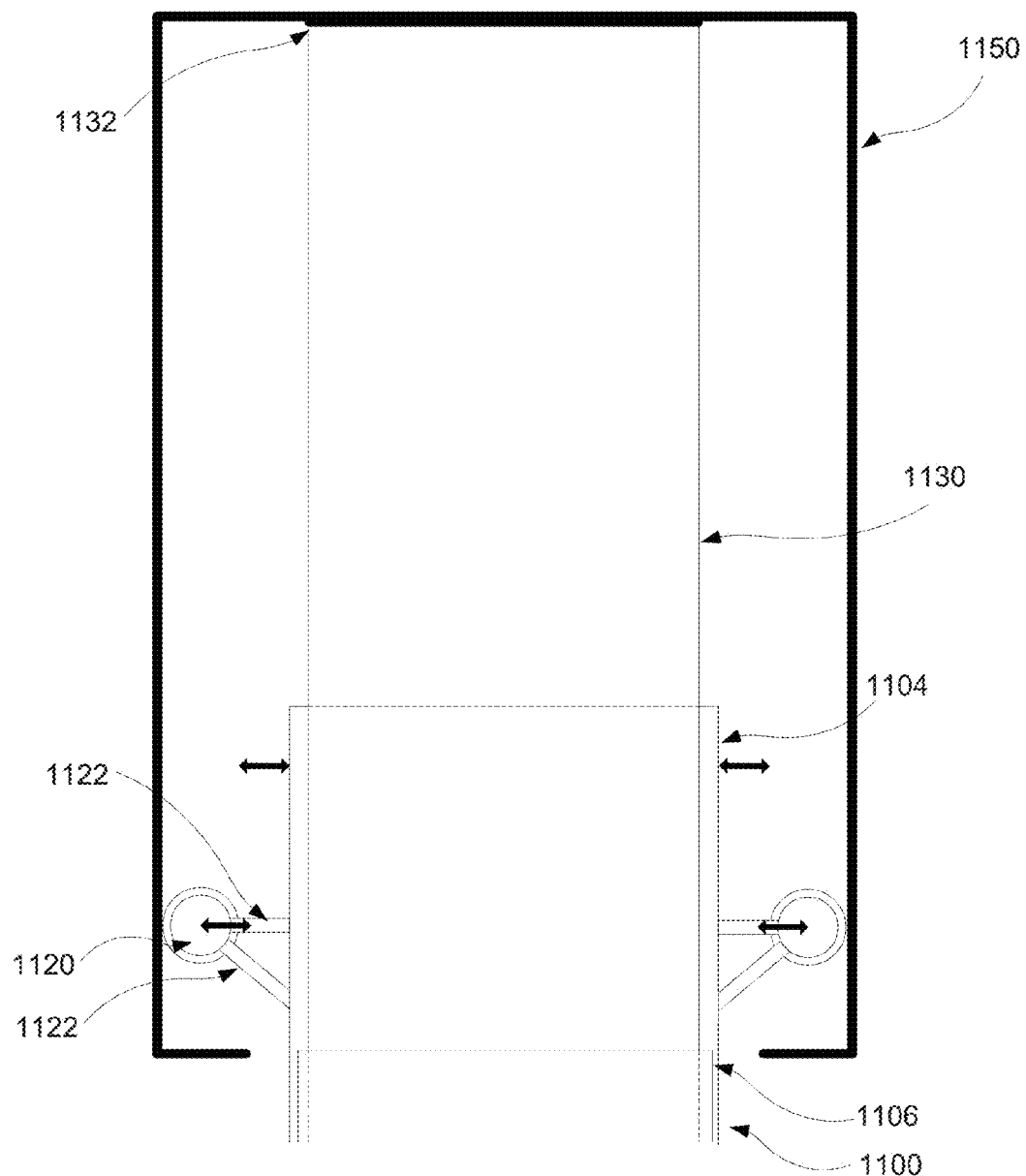
FIG. 11 illustrates additional aspects of some embodiments of an automatic unloader system as disclosed herein.

FIG. 11 illustrates additional aspects of some embodiments of an automatic unloader system as disclosed herein. This example shows a top-down view of a portion of an automatic unloader system 1100 partially deployed into a container 1150. The walls of container 1150 are illustrated by thick lines, including portions around the doorway or other opening, which could include door-roller tracks, hinges, or other hardware. Although the figures are not to scale, those of skill in the art will recognize that the doorway of such a container is typically narrower than the entire width of the container 1150.

This example shows base belt 1130 removably fastened to container 1150 at interior location 1132 along the back wall of container 1150. Base belt 1130 passes over nose ramp 1104 then beneath nose conveyor 1106.

This example also shows guide wheels 1120, mounted on either side of nose ramp 1104. Each guide wheel 1120 is mounted via one or more controllable actuators 1122, which can retract the guide wheels 1120 partially or fully into (or beneath) nose ramp 1104 so that they can pass through the doorway of container 1150. Moreover, a control system of the automatic unloader system 1100 can control the actuators 1122 so as to extend to the walls of container 1150 to act as a guide for the automatic unloader system 1100, so that the relative movement of automatic unloader system 1100 in container 1150 can be "steered" using the actuators 1122 and guide wheels 1120. The double-sided arrows on guide wheels 1120 illustrate that the guide wheels 1120 can be extended to each side of the nose ramp 1104 and also retracted, as necessary to guide automatic unloader system 1100 and to fit into the doorway of container 1150.

Similarly, nose ramp 1104 can be hinged or segmented so that the nose ramp 1104 can be extended to each side, as indicated by the double-sided arrows, to occupy substantially the entire width of the container 1150 once the nose ramp has passed the doorway of container 1150. This can be implemented, for example, by using overlapping, hinged segments for nose ramp 1150 that are expanded or contracted using actuators (similar to guide wheels 1120).

Figure 12:
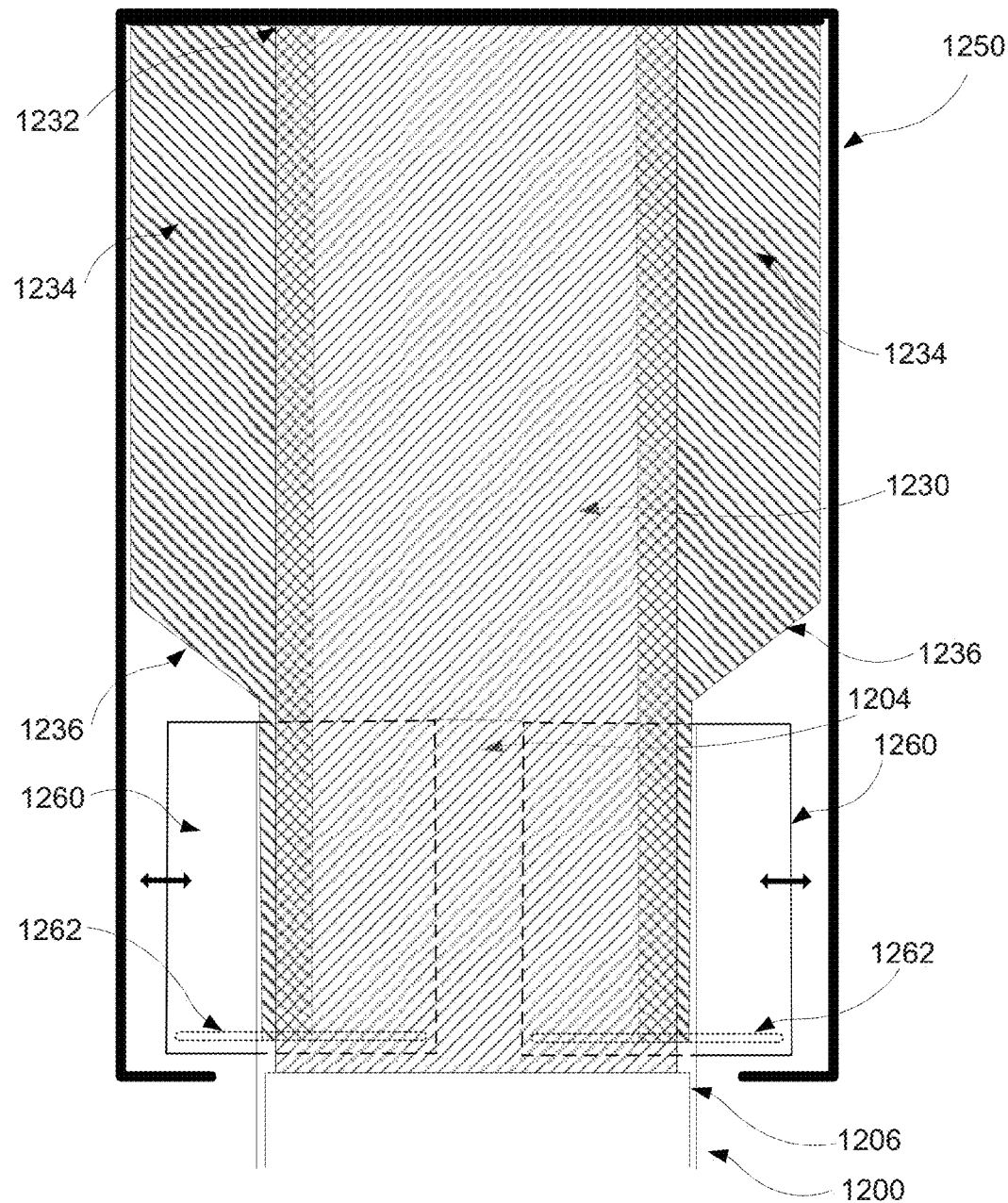
FIG. 12 illustrates additional aspects of some embodiments of an automatic unloader system as disclosed herein.

FIG. 12 illustrates additional aspects of some embodiments of an automatic unloader system as disclosed herein. This example shows a top-down view of a portion of an automatic unloader system 1200 partially deployed into a container 1250. The walls of container 1250 are illustrated by thick lines, including portions around the doorway or other opening, which could include door-roller tracks, hinges, or other hardware. Although the figures are not to scale, those of skill in the art will recognize that the doorway of such a container is typically narrower than the entire width of the container 1250.

This example shows a plurality of belts removably fastened to container 1250 at interior location 1232 along the back wall of container 1250, including base belt 1230 and side belts 1234. In this example, different cross-hatching is used to distinguish between base belt 1230 and side belts 1234, and helps illustrate where base belt 1230 overlaps side belts 1234 on each side. Base belt 1230 is substantially the same width as nose ramp 1204, which is narrower than the entire width of the container 1250 so it can fit through the doorway of container 1250. Side belts 1234 are on each side of base belt 1230, extending substantially to the sides of container 1250 on their outer sides, and are overlapped by base belt 1230 on their inner sides. Note that each side belt 1234 has a width transition 1236, where the outer edge of each side belt 1234 moves from substantially along the walls of container 1250 to a narrower dimension that can pass through the door of container 1250.

Base belt 1230 passes over nose ramp 1204 then beneath nose conveyor 1206. Side belts 1234 can also pass over nose ramp 1204 then beneath nose conveyor 1206, and can be collected or spooled, for example beneath nose conveyor 1206. Because side belts 1234 are not integral with base belt 1230, they can be drawn inward to the narrower dimensions of the nose ramp 1204, beneath the base belt 1230, while base belt 1230 remains spanning substantially the entire width of nose ramp 1204.

In this way, side belts 1234 can ensure that all of the loaded items in container 1250 are properly unloaded by automatic unloader system 1200, and none are missed because they fell off of the sides of base belt 1230.

This example shows a case where nose ramp 1204 includes side panels 1260 so that the nose ramp 1204 to be extended to each side. Once inside the doorway of container 1250, the side panels 1260 extend outwards to that the width of nose ramp 1204 (including side panels 1260) is expanded to match, at its end, the combined width of the base belt 1230 and side belts 1234.

In this example, each of the side panels 1260 has a side belt slot 1262 through which the respective side belts 1234 pass. When the side panels 1260 are fully outwardly extended, they substantially reach the walls of container 1250, and the side belt slots 1262 are placed to accept the full, wide width of the side belts 1234. When the side panels 1260 are fully inwardly located, can pass through the doorway of container 1250, and the side belt slots 1262 are placed to except the narrower width of the side belts 1234 (on the narrower side of width transition 1236).

As the unloader system 1200 moves into the container 1250, the side belts 1234 pass through the side belt slots 1262 of the side panels 126 and beneath unloader system 1200. Items located in the container 1250 on the side belts 1234 are gathered onto nose conveyor 1206 and processed with the items on base belt 1230.

Figure 13:
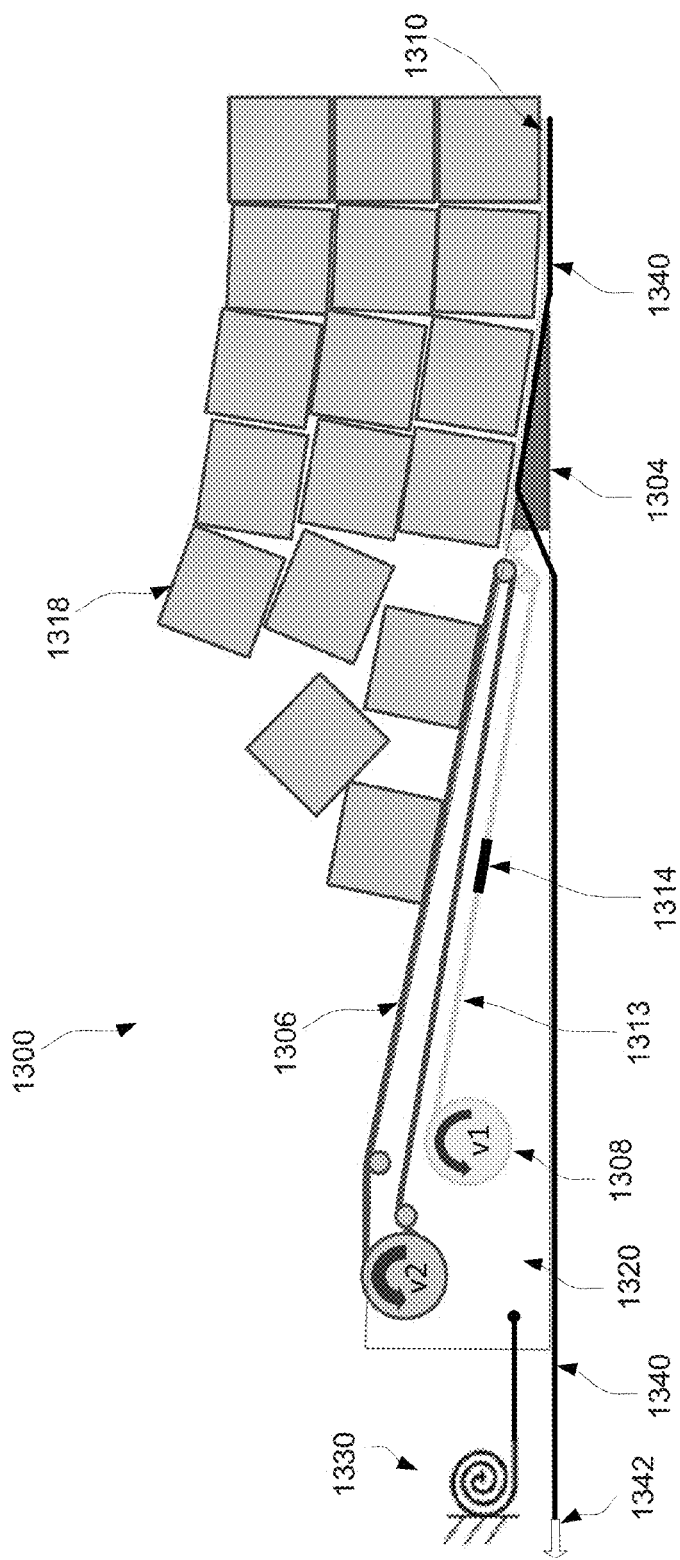
FIG. 13 illustrates a schematic detail view of an automatic unloader system according to disclosed embodiments.

FIG. 13 depicts a schematic detail view of an automatic unloader system 1300 according to disclosed embodiments that uses side belts 1340. In this side view, only the "near-side" side belt 1340 is shown, but those of skill in the art will recognize that there is a similar side belt on the other side of automatic unloader system 1300. The base belt 1310 has been routed over a nose ramp 1304, between the nose ramp 1304 and a nose conveyor 1306, and to a spooling roller 1308. Note that, in this example, the base belt may be connected to a spooling belt 1312 by a coupling mechanism 1314, or may be directly connected to spooling roller 1308. In this example, "base belt 1310" is intended to refer to both possibilities, whether the base belt 1310 is implemented as a single belt connected to spooling roller 1308, or implemented as a combination of a base belt coupled to a spooling belt that is then connected to the spooling roller 1308.

In this example, spooling roller 1308 acts as a tensioning mechanism for the base belt 1310 and also acts as a drive mechanism for automatic unloader system 1300. That is, as spooling roller 1308 winds base belt 1310 around itself, since base belt 1310 is removably fastened to the interior of trailer 202 (or other container), this winding action pulls automatic unloader system 1000 along base belt 1310 and into trailer 202. The automatic unloader system 1300 moves itself forward along base belt 1310, keeping nose ramp 1304 under the base belt under the base belt 1310 and loaded items 1318 by using the spooling roller 1308 to pull on the base belt 1310. As should be clear, spooling roller is physically mounted in a fixed position on the extendible portion 1320 of automatic unloader system 1300, such as proximate to the nose ramp 1304 or beneath the nose conveyor 1306.

In various implementations, when moving forward, the automatic unloader system 1300. moves at a speed $V_1$ that substantially matches a speed $V_2$ of a transport belt of the nose conveyor 1306. In this way, the items 1318 are transferred with substantially no relative motion from the base belt 1310 to the nose conveyor 1306.

Various embodiments can also include a retraction roller system 1310, that is mounted in a fixed position relative to the dock or other facility in which the automatic unloader system 1300 operates. Retraction roller system 1330 is connected to the extendible portion 1320 of automatic unloader system 1300, for example by a retraction belt, and can be used to retract the automatic unloader system 1300 from the trailer 202 (or other container). Retraction roller system 1330 can also be used to maintain a tension on extendible portion 1320 for additional control of placement and speed of automatic unloader system 1300 as it moves along the base belt 1310.

In this example, side belts 1340 are connected to the inside of the trailer 202 (or other container) and are overlapped by base belt 1310. The side belts 1340 pass over the end of nose ramp 1304 and pass through slots in nose ramp 1304 (such as through side belt slots in side panels as described above). After passing through the nose ramp 1304, the side belts 1340, in this example, pass under the frame of automatic unloader system 1300 to tensioners 1342 that maintain tension on the side belts 1340. In this example, "side belts 1340" is intended to refer to side belts running from the container to the tensioner, whether the side belts 1330 are each implemented as a single belt between the container and tensioner or implemented as a combination of belt portions connected between the container and the tensioner.

Other portions of the automatic unloader system 1300 can be implemented as described in any of the examples set forth herein.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In particular, the features and operations of various examples described herein and in the incorporated applications can be combined in any number of implementations.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. An automated unloading apparatus for use with a container having a plurality of items located on a base belt, the automated unloading apparatus comprising:
    a ramp configured to pass under the base belt;
    a conveyor configured to remove a first item from the plurality of items;
    a spooling roller configured to wind the base belt around itself and by doing so, move the automated unloading apparatus into the interior of the container.

2. The automated unloading apparatus of claim 1, wherein the spooling roller acts as a tensioning mechanism for the base belt and move the ramp under the first item.

3. The automated unloading apparatus of claim 1, further comprising a plurality of guide wheels configured to controllably extend from each side of the conveyor to respective sides of the container.

4. The automated unloading apparatus of claim 1, wherein the ramp is further configured to controllably expand to substantially an entire width of the container.

5. The automated unloading apparatus of claim 1, wherein the automated unloading apparatus is substantially stationary during an unloading process and moves into the interior of the container by relative motion of the container.

6. The automated unloading apparatus of claim 1, wherein the ramp is further configured to pass at least partially under a plurality of side belts.

7. The automated unloading apparatus of claim 1, further comprising a plurality of guide wheels configured to controllably extend from each side of the conveyor to act as a positioning mechanism for the automated unloading apparatus.

8. The automated unloading apparatus of claim 1, further comprising a retraction roller system configured to retract the automated unloading apparatus from the container.

9. An automated unloading system for use with a container having a plurality of items located on a base belt, the automated unloading system comprising:
    an operator console;
    a controller communicatively coupled to the operator console; and
    an automated unloading apparatus communicatively coupled to the controller, the automated trailer unloader including:

a ramp configured to pass under the base belt;
a conveyor configured to remove a first item from the plurality of items;
a spooling roller configured to wind the base belt around itself and by doing so, move the automated unloading apparatus into the interior of the container,
wherein the controller is configured to control operation of the automated unloading apparatus in response to an operator action at the operator console.

10. The automated unloading system of claim 9, wherein the spooling roller acts as a tensioning mechanism for the base belt and move the ramp under the first item.

11. The automated unloading system of claim 9, further comprising a plurality of guide wheels configured to extend from each side of the conveyor to respective sides of the container under control of the controller.

12. The automated unloading system of claim 9, wherein the ramp is further configured to expand to substantially an entire width of the container under control of the controller.

13. The automated unloading system of claim 9, wherein the automated unloading apparatus is substantially stationary during an unloading process and moves into the interior of the container by relative motion of the container.

14. The automated unloading system of claim 9, wherein the ramp is further configured to pass at least partially under a plurality of side belts.

15. The automated unloading system of claim 9, further comprising a plurality of guide wheels configured to extend from each side of the conveyor to act as a positioning mechanism for the automated unloading apparatus under control of the controller.

16. The automated unloading system of claim 9, further comprising a retraction roller system configured to retract the automated unloading apparatus from the container.

17. A method of unloading items from a container having a plurality of items located on a base belt, the method comprising:
moving a ramp of an automated unloading apparatus under the base belt and a first item of the plurality of items;
removing the first item from the plurality of items using a conveyor of the automated unloading apparatus; and
moving the automated unloading apparatus into the container by winding the base belt around a spooling roller.

18. The method of claim 17, wherein the spooling roller acts as a tensioning mechanism for the base belt and move the ramp under the first item.

19. The method of claim 17, further comprising extending a plurality of guide from each side of the conveyor to respective sides of the container.

20. The method of claim 17, further comprising expanding at least one end of the ramp to substantially an entire width of the container.

21. The method of claim 17, wherein the automated unloading apparatus is substantially stationary and moves into the interior of the container by relative motion of the container.

22. The method of claim 16, wherein the ramp is also moved at least partially under a plurality of side belts.

* * * * *